March 16, 1965  J. O. ALEXANDER ETAL  3,173,191
TOOL HOLDERS FOR USE WITH DETACHABLE INSERTS
Filed Sept. 30, 1963

3,173,191
TOOL HOLDERS FOR USE WITH DETACHABLE INSERTS
John Ord Alexander, Bishops Stortford, and James Hargreaves and Stanley Clifford Brown, Coventry, England, assignors to Wickman Wimet Limited, Coventry, England
Filed Sept. 30, 1963, Ser. No. 312,622
Claims priority, application Great Britain, Oct. 10, 1962, 38,322/62
2 Claims. (Cl. 29—96)

This invention relates to a toolholder of the kind used for clamping in position an insert having a cylindrical hole extending therethrough.

A toolholder of the kind specified and according to the invention comprises a shank which at one end is of reduced thickness so as to define a base for receiving an insert, and a side wall formed by the junction of one side of the base and the remainder of the shank, a screw-threaded bore extending into the base, and a screw-threaded pin in said bore and having an extension of truncated conical form extending from the bore, the arrangement being such that an insert can be placed on the base with a side of the insert in contact with said side wall, and said extension extending through the hole through the insert, the axis of said bore extending at an acute angle to the axis of said hole so that axial movement of the pin in one direction will cause the extension of the pin to clamp the insert against the side wall.

Figure 1:
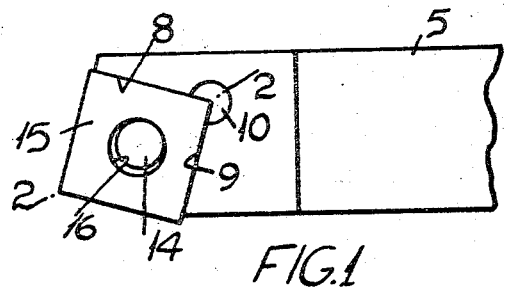
Figure 2:
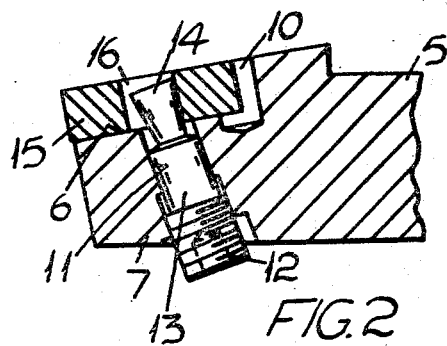

In the accompanying drawings, FIGURE 1 is a plan view illustrating one example of the invention, and FIGURE 2 is a section on the line 2—2 in FIGURE 1.

Referring to the drawings, there is provided a tool holder having a shank 5 which at one end has its top face cut away to provide a base 6 extending at an inclination to the lower face 7 of the shank, and a pair of side walls 8, 9 extending at right angles to each other and to one side of the base 6. For convenience in machining, a recess 10 is formed in the base 6 at the junction of the walls 8, 9.

Extending through the shank from the base 6 to the face 7 is a bore 11 the lower part of which is screw-threaded and the axis of which extends at an angle to the normal to the base 6. Within the bore 11 is engaged a pin having a screw-threaded portion 12 engaging the lower screw-threaded part of the bore, an intermediate cylindrical part 13 which is a sliding fit in the upper part of the bore, and an upper extension 14 of truncated-conical form extending upwards from said bore with the portion of greatest diameter outermost.

The toolholder is intended for use with inserts 15 which may be of square, triangular or other cross-section, but which in all cases have a cylindrical (but not necessarily right cylindrical) hole 16 therethrough with its axis parallel to the sides of the insert. As shown the insert is square, and in order to secure the insert in position it is placed on the base 6 with two sides of the insert in contact with the walls 8, 9 and with the extension 14 of the pin within the hole 16. In this position, the part of the extension nearest the junction of the walls 8, 9 contacts the edge of the hole, and the axes of the hole and pin are at an acute angle to one another as can be seen in FIGURE 2. Thus, retraction of the pin away from the base 6 causes portions of the extension of increasing diameter to make line contact the side of the hole, thereby clamping the insert against the walls 8, 9. The part 13 of the pin ensures that the extension 14 is correctly aligned.

In further examples, the side wall need not extend at right angles to the base, and the edge of the insert which contacts the side wall is not at right angles to the axis of the hole in the insert. However, in each case the arrangement is such that the axis of the bore extends at an inclination to the axis of the hole in the insert.

In the example described, the extension 14 makes line contact with the side of the hole in the insert. However, if the dimensions are not exactly correct, the extension 14 will bind either against the top or the bottom of the side of the hole without making line contact. No damage will be done if the extension binds against the top of the side of the hole, but binding against the bottom of the side of the hole tends to damage the insert. Consequently, in practice the design is such that the extension binds against the top of the side of the hole, so that slight errors in the dimensions will not cause unnecessary damage to the insert.

If desired, the insert may rest on an anvil placed on the base 6, the anvil having a central hole sufficiently large to accommodate movements of the pin, and being held in position by the pressure of the pin against the insert.

Having thus described our invention what we claim as new and desire to secure by Letters Patent is:

1. A tool holder for use with an insert which comprises a body in the form of a regular polygon having a central cylindrical hole extending therethrough, said tool holder comprising a shank, a portion of reduced thickness at one end of said shank, said portion of reduced thickness defining a base for receiving an insert, and a pair of side walls at the junction of said base and remainder of said insert, said side walls being inclined at an angle equal to the angle between adjacent sides of an insert, a screw-threaded bore extending into said base, a screw-threaded pin engaged in said bore and having an extension of truncated conical form extending from said bore into said cylindrical hole in said insert, the axis of said bore extending at an acute angle to the axis of said hole in said insert, said truncated-conical extension making line contact with the hole in said insert, and axial movement of said pin clamping said insert against said side walls.

2. A tool holder as claimed in claim 1 in which said pin includes a cylindrical part between said extension and said screw-threaded part, said cylindrical part sliding in a part of said bore which is not screw-threaded.

References Cited by the Examiner

UNITED STATES PATENTS

| | | | |
|---|---|---|---|
| 1,838,520 | 12/31 | Archer | 29—98 |
| 2,598,581 | 5/52 | McKenna | 29—98 |
| 3,060,771 | 10/62 | Johnson | 29—96 |

FOREIGN PATENTS

| | | |
|---|---|---|
| 1,245,148 | 9/60 | France. |
| 350,706 | 6/31 | Great Britain. |
| 831,244 | 3/60 | Great Britain. |

WILLIAM W. DYER, JR., *Primary Examiner.*

Notice of Adverse Decision in Interference

In Interference No. 95,189 involving Patent No. 3,173,191, J. O. Alexander, J. Hargreaves, and S. C. Brown, TOOL HOLDERS FOR USE WITH DETACHABLE INSERTS, final judgment adverse to patentees was rendered Nov. 17, 1966, as to claim 1.

[*Official Gazette January 31, 1967.*]